US006723239B2

(12) United States Patent
Maxwell

(10) Patent No.: US 6,723,239 B2
(45) Date of Patent: Apr. 20, 2004

(54) SPIN-ON FILTER ELEMENT AND FILTER HEAD

(75) Inventor: Martin C. Maxwell, Ripon, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 140 days.

(21) Appl. No.: 10/125,103

(22) Filed: Apr. 17, 2002

(65) Prior Publication Data

US 2002/0162782 A1 Nov. 7, 2002

Related U.S. Application Data

(60) Provisional application No. 60/288,037, filed on May 2, 2001.

(51) Int. Cl.[7] .............................................. B01D 35/157
(52) U.S. Cl. ....................... 210/235; 210/249; 210/430; 210/440; 210/450; 210/DIG. 17
(58) Field of Search ................................ 210/233, 234, 210/235, 248, 249, 418, 429, 430, 440, 443, 444, 450, DIG. 17

(56) References Cited

U.S. PATENT DOCUMENTS

| 2,544,244 A | 3/1951 | Vokes |
| 3,317,048 A | 5/1967 | Xasten |
| 3,319,791 A | 5/1967 | Horne |
| 3,591,004 A | 7/1971 | Roosa |
| 4,024,890 A | 5/1977 | Yasuoka |
| 4,045,349 A | * 8/1977 | Humbert, Jr. |
| 4,222,875 A | * 9/1980 | Sikula, Jr. |
| 4,228,011 A | 10/1980 | Cote, Jr. |
| 4,237,015 A | 12/1980 | Fearnhead |
| 5,049,269 A | 9/1991 | Shah |
| 5,207,898 A | 5/1993 | Hodgkins |
| 5,362,390 A | * 11/1994 | Widenhoefer |
| 5,419,530 A | 5/1995 | Kumar |
| 5,698,093 A | * 12/1997 | Pyle |
| 6,053,334 A | * 4/2000 | Popoff et al. |

FOREIGN PATENT DOCUMENTS

GB          1075424        * 7/1967

* cited by examiner

Primary Examiner—Matthew O. Savage
(74) Attorney, Agent, or Firm—Christopher H. Hunter

(57) ABSTRACT

A filter head and a spin-on fuel filter element where the filter head includes an inlet and an outlet. A threaded nipple extends downwardly from a base of the filter head and includes a central flow passage. A valve member located in the flow passage is normally biased closed. The valve member includes a threaded portion extending outwardly from the nipple. The filter element includes upper and lower end caps, and is located in a housing having a tap plate. The tap plate includes a threaded central opening for screwing the filter element onto the filter head. The upper end cap supports a threaded sleeve which is screwed onto the valve member. The sleeve/valve member combination has a different thread pitch than the tap plate/nipple combination, which moves the valve member to an open position when the filter element is installed on the filter head.

28 Claims, 7 Drawing Sheets

SPIN-ON FILTER ELEMENT AND FILTER HEAD

CROSS-REFERENCE TO RELATED CASES

The present application claims the benefit of the filing date of U.S. Provisional Application Serial No. 60/288,037; filed May 2, 2001.

FIELD OF THE INVENTION

The present invention relates to liquid filtration systems, and in particular to spin-on types of filter elements and filter heads therefor.

BACKGROUND OF THE INVENTION

Vehicles powered by liquid petroleum fuels, such as diesel fuel or gasoline, have fuel systems that typically include fuel filters. The fuel filter operates to minimize the risk that contaminates, such as dirt particles or water, will reach other components of the system where the contaminates may cause damage.

There are many types of fuel filters known in the prior art. Some provide only particulate filtration. Others provide filtration and water separation. A popular configuration for fuel filters for larger vehicles includes a stationary head which is connected in the fuel line of the vehicle fuel system. A replaceable element attaches to the head, usually in "spin-on" fashion. The element may be replaced periodically to prevent the element from being clogged by contaminates.

One problem with such spin-on elements is that when a filter element is removed from the filter head, any fuel remaining in the head can drain out of the head onto the operator, the surrounding engine, and/or the ground. This is undesirable from a clean-up and environmental standpoint. Air can also enter the head and pass downstream to the remainder of the fuel system. This can cause rough operation of the engine during start-up, as well as damage downstream components.

Another problem is that filter elements with different efficiencies, applications, and/or qualities can sometimes fit on the same filter head. It is important to replace a spent element with the same or a similar type of element to ensure proper filtration of the fuel. It is also important to run the engine with an element installed. Failing to install an element can also allow damage to occur to downstream components.

Certain elements have been designed whereby the element can only fit a certain filter head, and where the filter will not operate without such a filter element installed. Clausen, U.S. Pat. No. 5,643,446, for example, shows and describes a valve in the filter head which is actuated by an elongated projection on the filter element. The projection extends upwardly from one of the end caps on the element, and pushes the valve element upwardly (inwardly) into the filter head when the element is attached to the head. The valve generally remains closed if an incorrect element (without such a projection) is installed, or if no element is present. The valve also prevents fuel from draining out of the filter head when the element is replaced, and prevents air entering the filter head.

While the Clausen filter has been useful in many lower-pressure applications, the valve in the filter head may open in higher pressure applications. This is because the fuel pressure can urge the spring-biased valve inwardly into the head when the pressure increases above the cracking force of the spring. Strong springs and robust valve elements have therefore been used to keep the valve in a closed position. However, it can be more difficult to assemble the filter element on the filter head with such stronger springs. The strong springs and robust valve elements also add cost and complexity to the filter head--as well as to the filter element, as the projection on the filter element must be strengthened. Even with all these precautions, the undesirable opening of the valve may still occur in some high pressure situations.

It is therefore believed that there is still a need for a simple, compact, easy-to-assemble, spin-on filter element and filter head, where the filter element can only be used with a specific filter head, and where the filter will not operate without such a filter element installed. It is also believed there is a demand for a filter where the filter head prevents fuel draining out of the head, and air entering the head, when the filter element is removed.

SUMMARY OF THE PRESENT INVENTION

The present invention provides a novel and unique spin-on type of filter element and filter head therefor. Fuel is prevented from draining out of the filter head and air is prevented from entering the head, when an element is removed. The filter head can also only be used with a specific filter element, and the filter will not operate without such a filter element installed.

According to the present invention, the filter head has inlet and outlet ports. An annular inlet chamber is provided in the base of the head, and is fluidly connected to the inlet port. A threaded nipple is centrally located and projects axially away from the base. The nipple includes an internal flow passage fluidly connected to the outlet port. A valve assembly including elongated, spring-biased valve member is located in the flow passage of the nipple. The valve member is normally biased upwardly into a closed position—preventing flow through the passage. A portion of the valve member projects outwardly from the nipple. The outwardly-projecting portion includes a series of threads.

The filter element of the present invention includes a cylindrical housing enclosing a ring-shaped filter media. The housing preferably includes an open first end, and a second end. The second end can be closed, or can be open and include means to allow attachment of a collection bowl. End caps are provided at each end of the filter media, with an annular portion of each end cap fixed (e.g., adhesively bonded) to the respective end of the media. A tap plate encloses the filter element in the housing, and is secured to the open end of the housing. The tap plate includes a central threaded opening, and a series of peripheral openings spaced radially outward from the central opening. The central tap plate opening cooperates with the threaded nipple on the filter head to allow the filter element to be screwed on (spun-on) to the filter head. The peripheral openings are located for receiving fuel from the inlet chamber of the filter head when the element is attached to the filter head.

The filter element supports a threaded sleeve internally of the element, co-axially aligned with the central opening in the tap plate. The threaded sleeve cooperates with the threaded valve member of the filter head when the filter element is screwed onto the head to cause the valve member to move to an open position. The thread pitch (angle) on the valve member/sleeve combination is preferably greater than the thread pitch of the nipple/tap plate combination, which causes the valve member to be pulled or drawn axially outward from the nipple as the filter element is threaded onto the filter head, allowing flow through the nipple. The threaded sleeve can be supported on a radial end wall at the internal end of an annular wall extending axially inward into the media from the upper end cap, or by other means that rigidly supports the sleeve centrally in the filter element. Fluid can pass through the openings in the radial end wall the radial supports to the central passage in the nipple and then to the outlet in the filter head when the filter element is installed. The threaded sleeve, radial end wall and annular internal wall are preferably formed integrally (and more preferably, unitarily) with the annular portion of the end cap.

As described above, the screwing of the filter element onto the filter head causes the valve member to move to an open position. This enables fuel to flow out of the filter element to the outlet of the filter head. Disengagement of the filter element allows the valve member to move to a closed position. This prevents air entering the head and passing downstream to the remainder of the fuel system when the element is removed. This also prevents fuel draining out of the head during an element change.

The threaded sleeve on the filter element is sized and configured so that only a sleeve having a certain length, diameter, and thread pitch will properly engage the threads on the valve member to draw the valve member to an open position. The sleeve may have different configurations with various elements, each of which corresponds to a particular filter head. Further, the valve assembly is constructed such that if an improper element is installed, fuel normally forces the valve member into a closed position, which prevents the valve element from opening during high pressure situations. As a result, only a proper filter element will operate in conjunction with the filter head, and the filter head will not operate without a proper filter element installed.

Further features of the present invention will become apparent to those skilled in the art upon reviewing the following specification and attached drawings.

DETAILED DESCRIPTION OF THE PREFERRED EMBODIMENT

Figure 1:
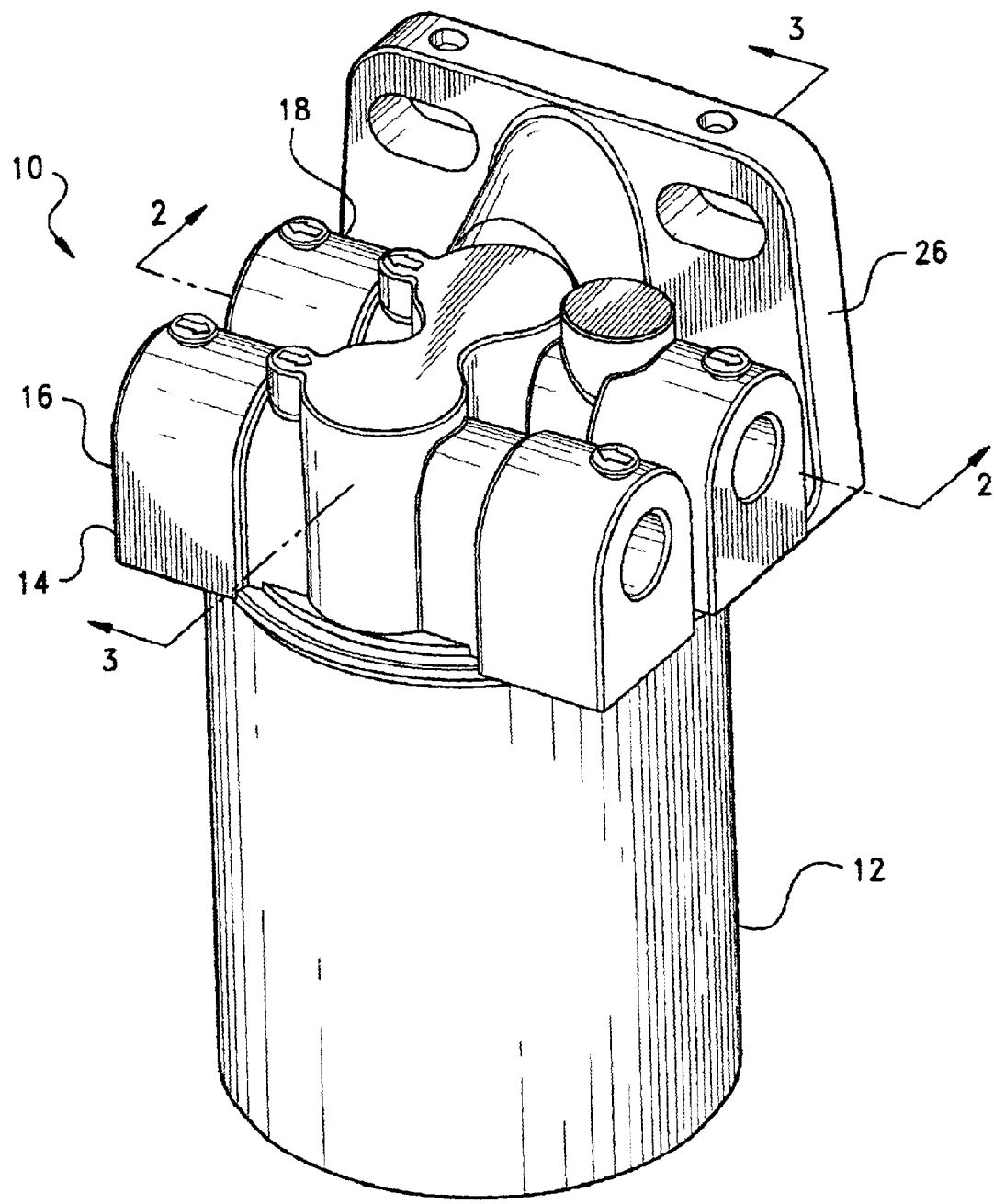
FIG. 1 is an elevated perspective view of a filter constructed according to the principles of the present invention.
Figure 2:
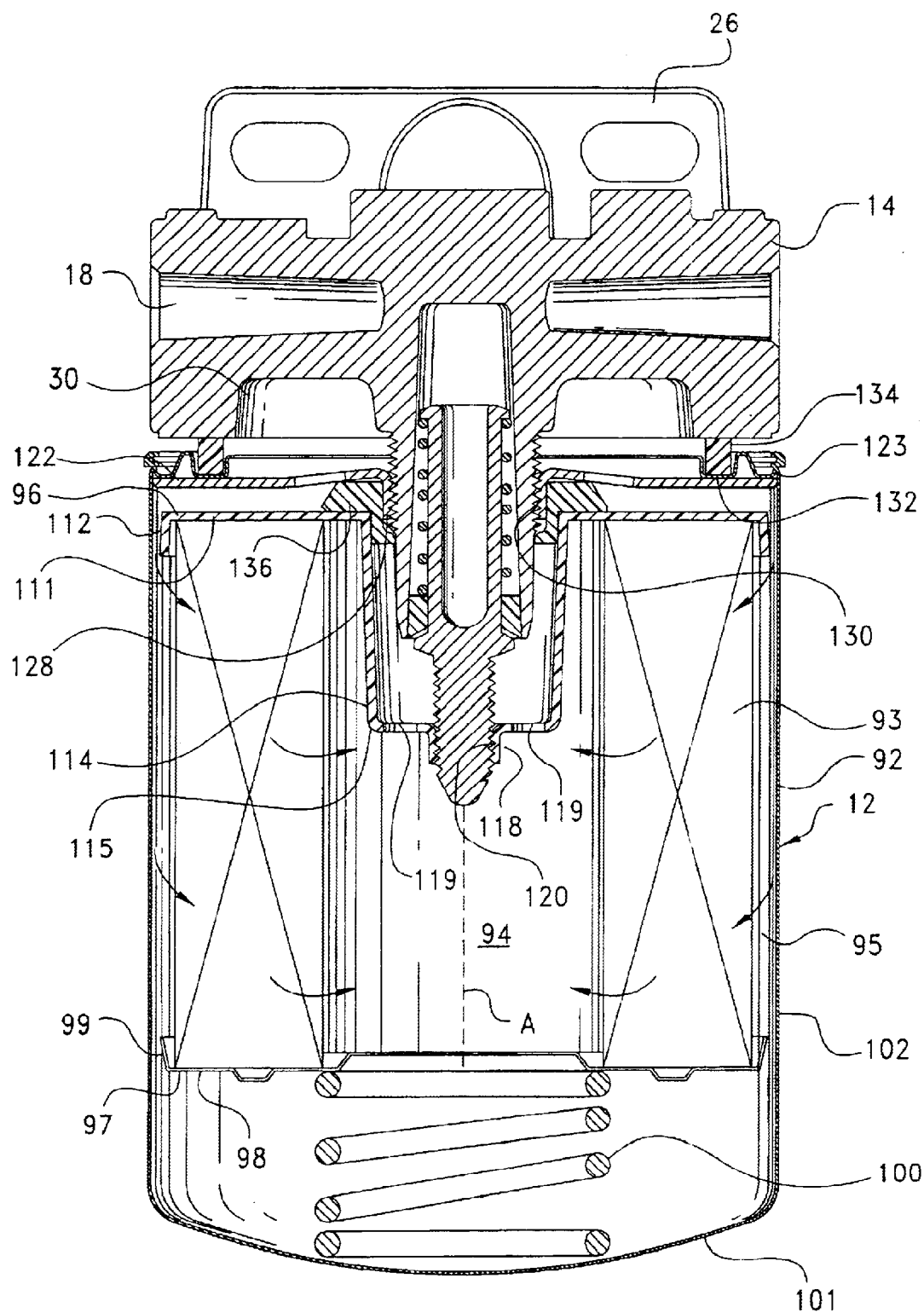
FIG. 2 is a cross-sectional side view of the filter taken substantially along the plane described by the lines 2—2 of FIG. 1.
Figure 3:
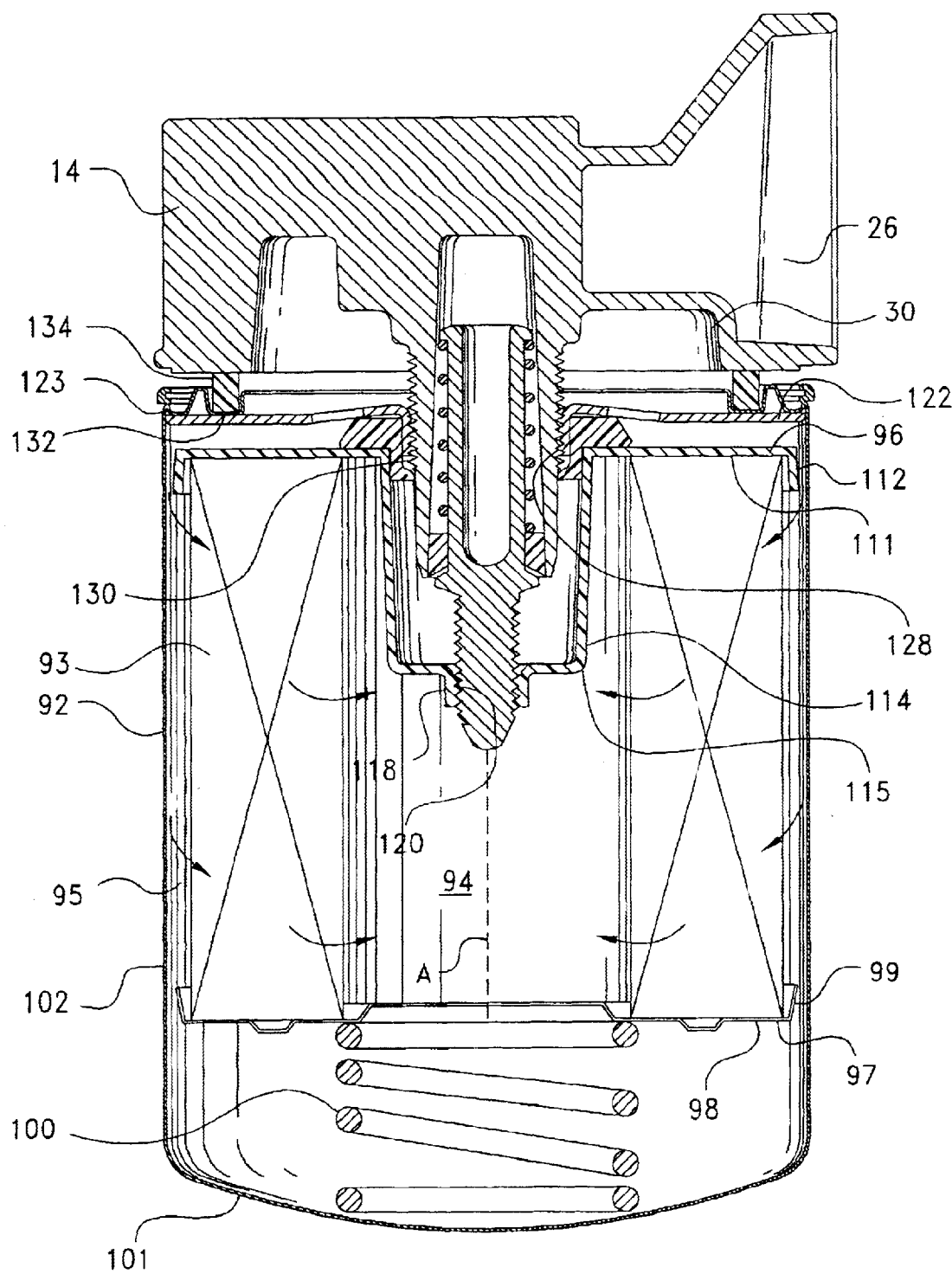
FIG. 3 is a cross-sectional side view of the filter taken substantially along the plane described by the lines 3—3 of FIG. 1.

Referring now to the drawings and initially to FIGS. 1–3, there is shown a filter including a filter head, indicated generally at 10, and a spin-on filter element, indicated generally 12, constructed according to the principles of the present invention. The filter element 12 is illustrated as being attached to the filter head, and is adapted to be spun onto (and spun off of) the filter head 10, as will be described herein in more detail.

The filter head 10 includes a base 14 with an inlet passage (or port) 16 and an outlet passage (or port) 18. The body is shown having multiple inlet and outlet passages to enable the head to be easily connected into a fuel system from either side. Plugs (not shown) are typically inserted into the unused passages, although certain applications may use more than one inlet and/or outlet passage(s). The filter head further includes a mounting plate 26 to facilitate mounting the filter head on a vehicle.

Inlet 16 is connected to a fuel line (not shown) which in turn is connected to a fuel tank of a vehicle in a conventional manner. Inlet 16 is also in fluid communication with an inlet chamber 30 in the filter head. Chamber 30 has an annular configuration and opens to the bottom of the filter head. While not shown, appropriate check valves and/or a priming pump can be included in the filter head, if so desired. Reference may be had to U.S. Pat. Nos. 5,362,392 and 5,207,898, for a description of such check valves.

Figure 4:
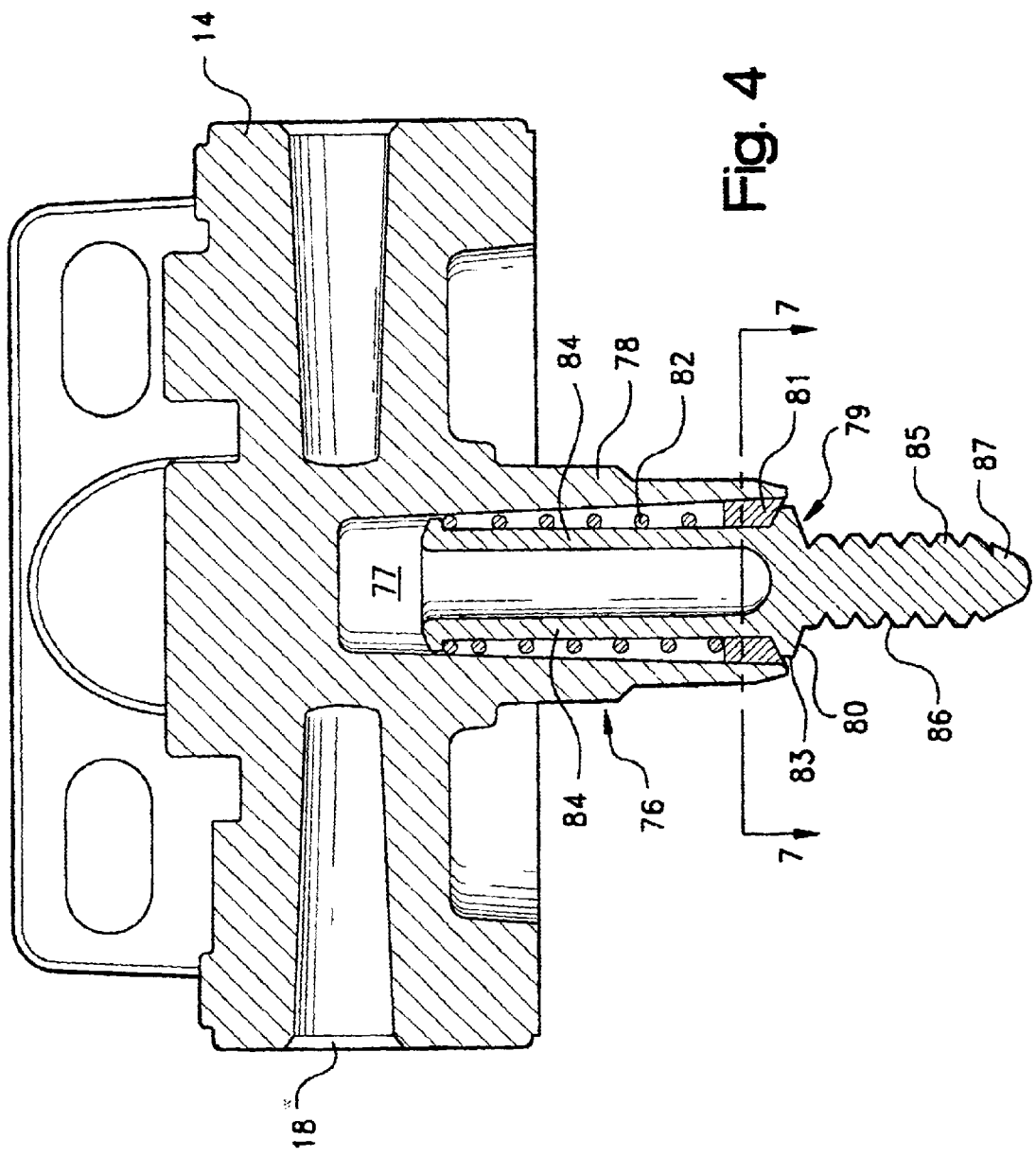
FIG. 4 is an enlarged, cross-sectional side view similar to FIG. 2, but with the filter element removed.
Figure 5:
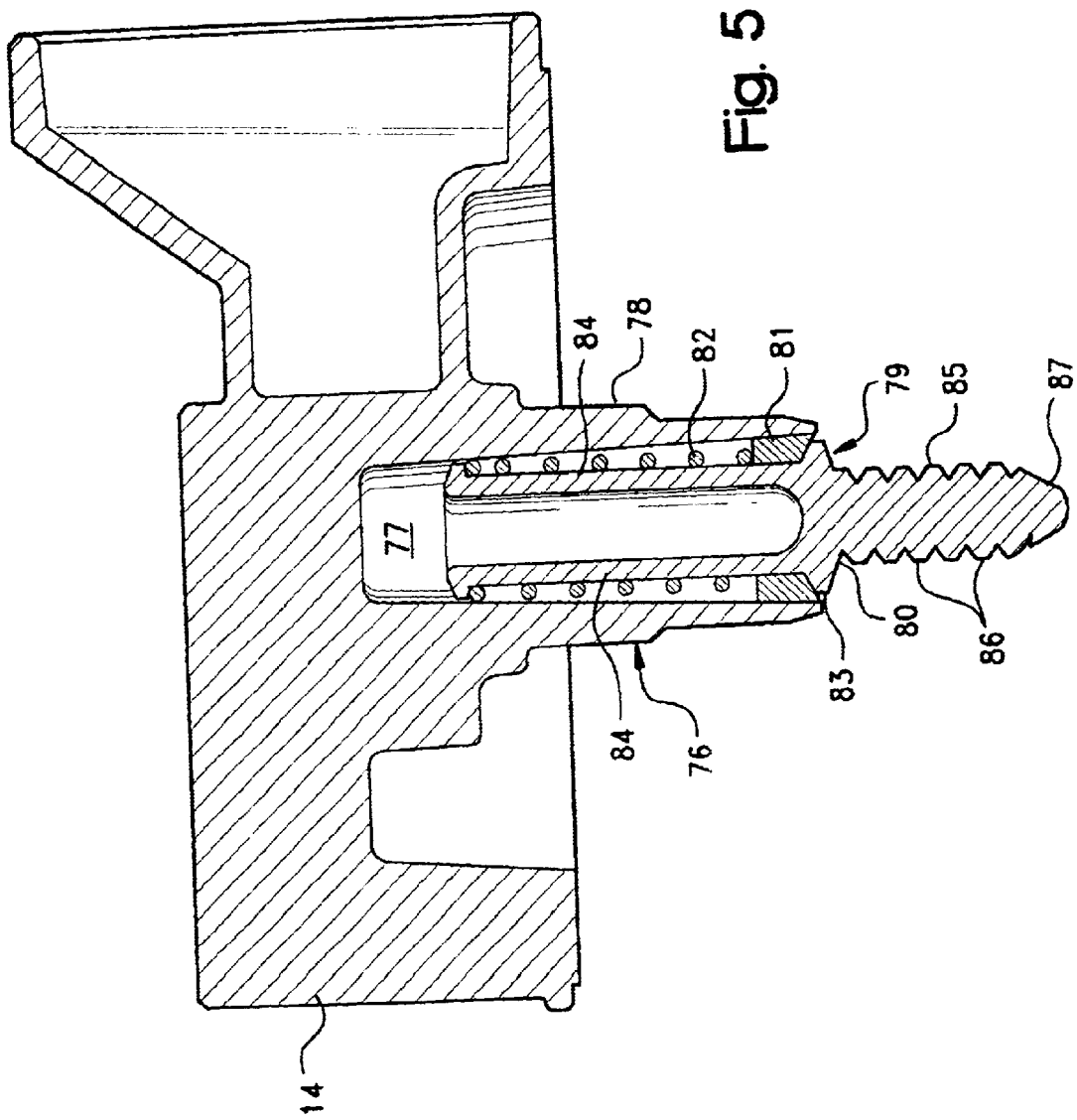
FIG. 5 is an enlarged, cross-sectional side view similar to FIG. 3, but with the filter element removed.

Referring now to FIGS. 4 and 5 a cylindrical nipple, indicated generally at 76, is provided centrally on the filter head base 14, and extends outwardly (downwardly) therefrom. Preferably nipple 76 is formed unitary with the base, and includes a central cylindrical passage 77 that is fluidly connected at its upper end to the outlet passage 18. Threads 78 are provided on the outer surface of the nipple.

Figure 6:
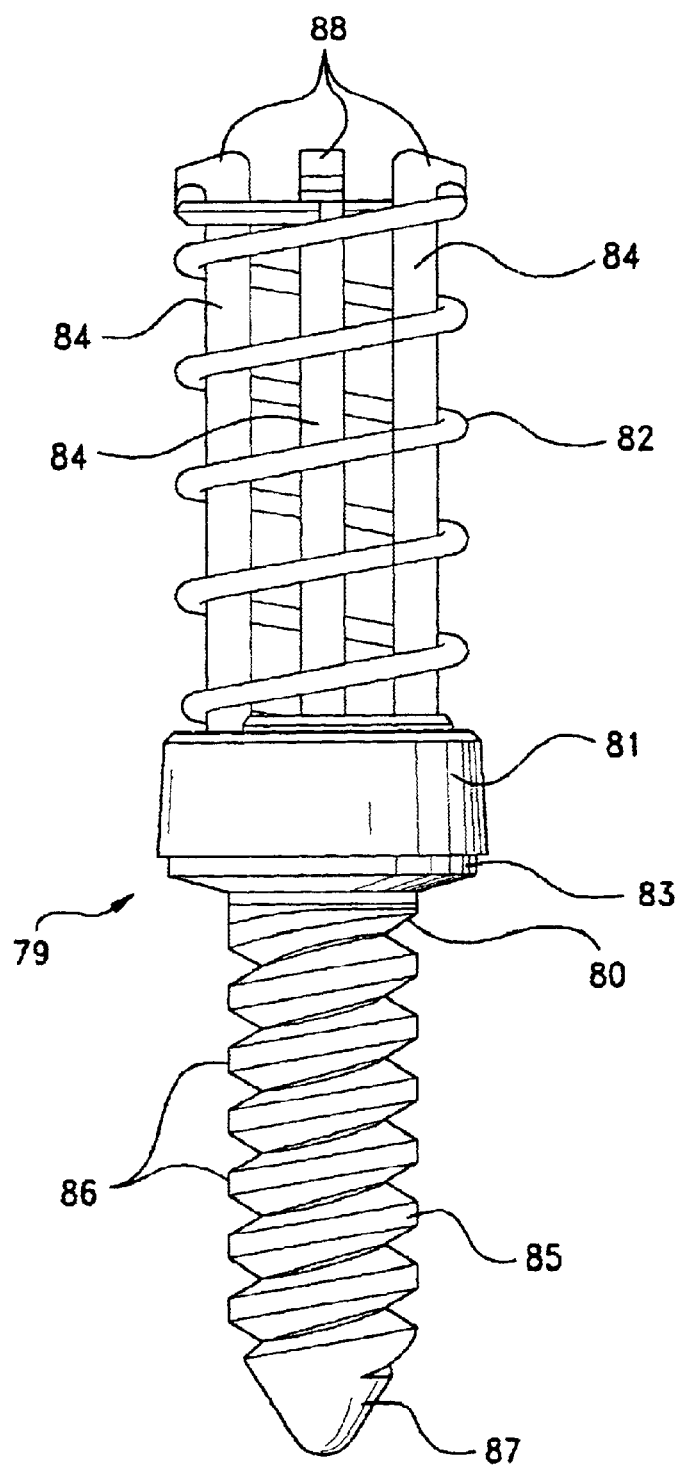
FIG. 6 is a perspective view of the valve assembly for the filter head.
Figure 7:
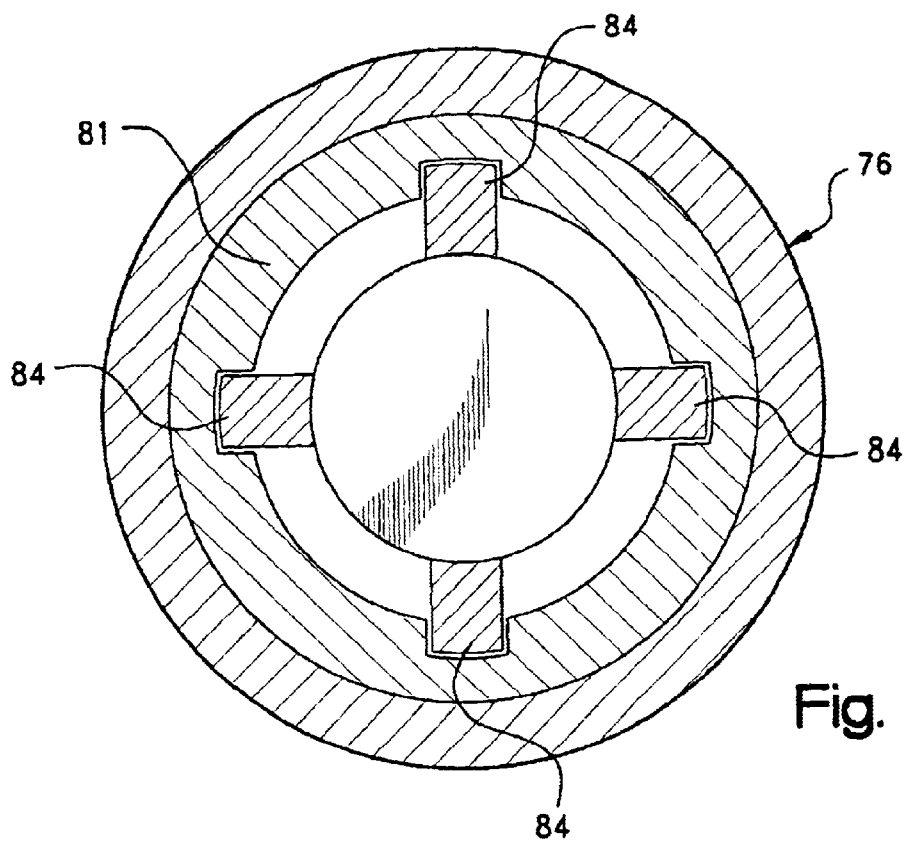
FIG. 7 is a cross-sectional end view of the filter head taken substantially along the plane described by the lines 7—7 of FIG. 4.

A valve assembly, indicated generally at 79, is provided centrally within the nipple. Valve assembly 79 includes an elongated valve member 80, an annular seal or gasket 81, and a compression spring 82. As also shown in FIG. 6, valve member 80 includes a circular body 83 with a series of elongated fingers 84 projecting axially upward from one (upper) surface of body 83, and a cylindrical engaging portion 85 extending axially downward from an opposite (lower) surface of body 83. The engaging portion 85 includes threads 86 on its outer surface, and a distal end which preferably terminates in a conical tip 87. As will be discussed below, the threads 78 on the nipple 76 have a thread pitch (angle) that is preferably different than the thread pitch (angle) of the threads 86 on the valve member 80.

Spring 82 biases the valve member inwardly (upwardly) into the nipple. Spring 82 extends between radially outward projecting tabs 89 at the upper end of fingers 84 and the upper (inner) surface of annular gasket 81. Gasket 81 is press-fit or otherwise secured within the distal end of the nipple, and has a central opening slightly larger than the extending fingers of the valve member such that the valve member is centered within the nipple, but allowed to move axially therein. The body 83 of the valve member is wider than the annular seal gasket, and the spring 82 biases the body of the valve member against the lower surface of the seal/gasket to provide a fluid-tight seal therewith. Fingers 84 are preferably equally-spaced around body 83 such that the spring applies even pressure against the valve member. While four such fingers are shown, it should be appreciated that the number of fingers could vary, depending upon the particular application.

Seal 81 includes notches or channels as at 88 that receive and guide the fingers 84 so that the valve member can move easily axially inwardly and outwardly from the nipple. The periphery of the body 83 and seal 81 preferably have complementary tapered or chamfered surfaces to facilitate locating and sealing the valve member in the nipple. The spring assembly is thereby initially pre-assembled, and pushed up into the nipple. The friction fit of the seal and the notches prevent the valve member from rotating with respect to the nipple, but allow the valve member to move easily axially inward and outward from the nipple. The valve member is biased outwardly from the nipple by spring 82.

As shown in FIGS. 2 and 3, filter element 12 includes a cylindrical canister or housing 92 enclosing a ring of filter media 93. Media ring 93 is preferably a conventional type of media appropriate for the particular application. The media ring 93 circumscribes a central cylindrical chamber 94, and a peripheral annular chamber 95 is defined between the media ring 93 and canister 92. A first end cap 96 is provided at one (upper) end of the media, while a second end cap 97 is provided at the second (lower) end of the media. Second end cap 97 entirely closes the lower end of the media to prevent fluid flow therethrough, and includes a flat annular body portion 98 fixed (e.g. adhesively bonded) to the end of the media, and a short annular skirt 99 surrounding a portion of the exterior surface of the media ring.

Second end cap 97 is supported on a compression spring 100, which itself is supported against the lower end 101 of the canister. Spring 100 prevents the element from moving and vibrating within the canister. The canister also includes a side wall 102, which is preferably formed integral with (and more preferably unitary with) the lower end 101, such as by roll seaming or spin-forming, although the lower end 101 could also be a separate component and attached to side wall 102 such as by welding or brazing. The lower end of the element could also be entirely open to allow attachment of a collection bowl, as should be well-known to those skilled in the art. Discussion of such a filter element and collection bowl combination can be found in U.S. Pat. Nos. 5,207,898 and 4,740,299.

The first end cap 96 also includes a flat annular portion 111 fixed (e.g., adhesively bonded) to the upper end of the media, and a short annular skirt 112 extending downwardly and surrounding a portion of the media. An imperforate annular side wall 114 inwardly bounds and extends axially inwards from the annular portion 111, preferably in radially spaced-apart relation to the media ring 93. A flat annular end wall 115 is connected to the axially inner end of the side wall 114, and projects radially thereacross. A central annular sleeve 118 inwardly bounds the end wall 115 and extends axially further inward from the end wall, co-axial with the central axis "A" of the element. One or more openings 119 (FIG. 2) are formed in end wall 115, between side wall 114 and sleeve 118. The number and dimension of the openings 119 can be determined depending upon the particular application.

The annular end wall is only one such way to support sleeve 118 centrally in the housing. The sleeve 118 can be supported using alternative means, and can be supported from alternative locations within the element. For example, the sleeve could be supported by radially extending spokes extending inwardly from wall 114, or could be connected directly to second end cap 97, instead of first end cap 96. Other appropriate attachment means and locations should be appreciated by those of ordinary skill in the art, as long as the attachment means rigidly supports the sleeve centrally within the element.

In any case, sleeve 118 includes internal threads 120. The thread pitch (angle) of the threads 120 on sleeve 118 preferably matches the thread pitch (angle) of the threads 86 on valve member 80, such that the sleeve can be easily screwed onto and off of the valve member. The conical tip 87 on the valve member 80 facilitates inserting and locating the valve member properly with respect to the sleeve 118.

Preferably the first and second end caps 96, 97 are each formed unitarily, in one piece, with the threaded sleeve 118, radial end wall 115 and annular side wall 114 being formed integrally (and more preferably unitarily) with the annular portion 111 of the first end cap 96. It is possible that the end caps, and particularly the annular portion 111 and annular wall 114 of the first end cap 96, can be formed in separate pieces and fixed together in an appropriate manner (such as by brazing, welding, etc.).

Figure 8:
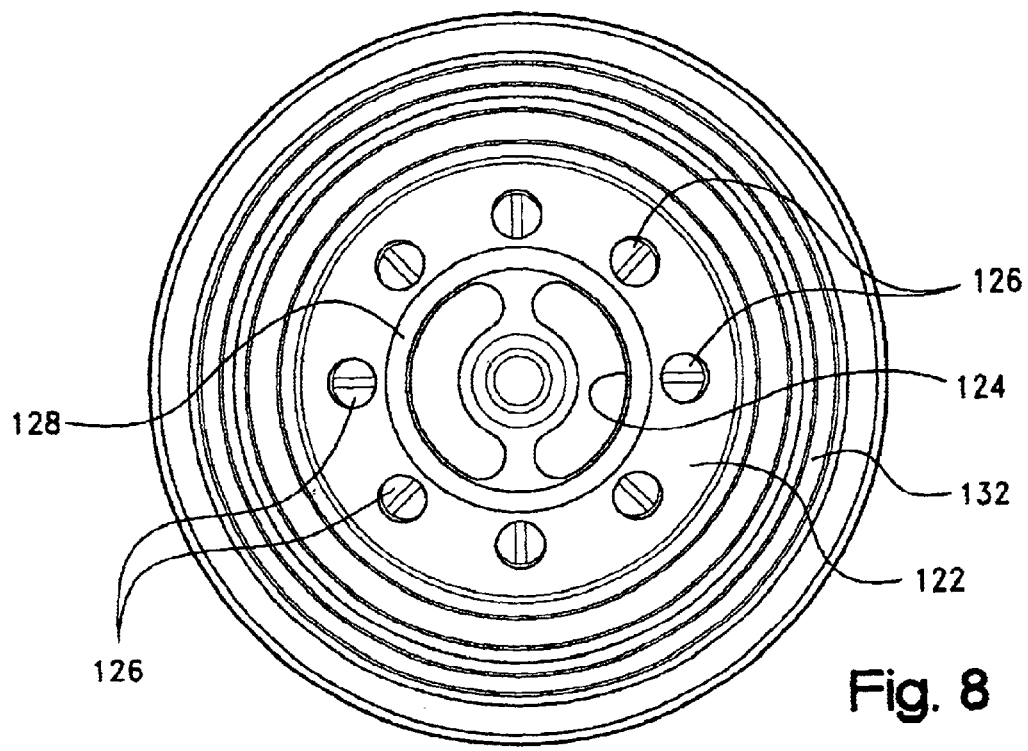
FIG. 8 is an end view of the filter element.

A tap plate 122 closes the upper end 123 of the housing. As also shown in FIG. 8, tap plate 122 is preferably a conventional tap plate and includes a central circular opening 124 coaxial with the central axis "A" of the housing, and also co-axial with sleeve 118. A series of peripheral openings 126 are provided in the tap plate, radially outwardly spaced from the central opening, and located for receiving flow from annular inlet chamber 30 in the filter head. The number of peripheral openings 126 can vary, depending upon the flow requirements. The tap plate includes a turned-in annular flange 128 bounding the central opening 124 and projecting a short distance axially inward. Inwardly-directed threads 130 are formed on the in-turned flange 128 of the tap plate. Threads 130 preferably have the same thread pitch (angle) as the threads 78 on nipple 76, such that the tap plate can be easily screwed onto and off of the nipple. An annular crimp plate 132 secures the tap plate 122 to the housing. Crimp plate 132 is crimped around the open end 123 of the housing 92, in a conventional manner.

Crimp plate 132 includes an outwardly-facing annular groove which receives an annular resilient gasket 134. Gasket 134 seals against the body 14 of the filter head when the filter element is assembled with the filter head to prevent fuel leakage between the filter head and filter element.

A resilient annular gasket 136 (FIG. 2) is also located between the in-turned flange 128 of the tap plate and nipple 76. Gasket 136 seals against the exterior surface of the nipple 76 when the filter element is screwed onto the filter head, and fluidly separates the dirty fuel from the clean fuel passing through the filter element. A thin membrane (not shown) can be provided across gasket 136 or across sleeve 188 to prevent contaminants from entering the clean side of the filter element before the filter element is attached to the filter head. The point 87 of valve member 80 punctures the membrane when the filter element is installed on the filter head.

As shown in FIGS. 4 and 5, the valve member 80 is normally biased into a position preventing fuel flow through nipple 76. The circular body 83 of the valve member is normally sealed against the annular seal 81. When the element is screwed on to the filter head, as shown on FIG. 2 and 3, the threads on the valve member 80 engage the threads on the sleeve 118, and pull the valve member outwardly from the nipple. Because the threads on the valve member/sleeve combination have a different pitch angle than the threads on the nipple/tap plate combination, which pitch angle is preferably greater for the valve member/sleeve combination than for the nipple tap plate combination, the valve member is pulled axially outward from the nipple to a greater extent than the amount that the filter element is screwed onto the nipple of the filter head. This results in the valve element being pulled away from the annular seal, and thereby opening a flow path between the element and seal.

In one embodiment, the thread portion of the valve member/sleeve combination had five (5) threads per inch (TPI), while the threaded portion of the nipple/tap plate combination had twelve (12) TPI. This was found to pull the valve member 0.250" when the filter element was fully screwed on to the filter head. Of course, the number and pitch/angle of the threads can vary depending on the particular application, and the desired opening of the valve member. In any case, as the valve member is drawn outwardly from the nipple, body 83 of the valve member moves away from its seat with the annular seal 81, to thereby allow fuel to flow from the central chamber 94 of the filter element, between the body 83 and the seal 81, between fingers 84, and through the passage 77 to the outlet passage 18.

The threaded sleeve 118 on the filter element is sized and configured so that only a sleeve having a certain length, diameter, and thread pitch will properly engage the threads on the valve member 80 to draw the valve member to an open position. The sleeve may have different configurations within various elements, each of which corresponds to a particular filter head. Fuel is prevented from flowing through the filter head, even during high-pressure conditions, when a filter element is not attached, as the fuel pressure normally forces the valve member into a closed position. As a result, only a proper filter element will operate in conjunction with the filter head, and the filter head will not operate without a filter element attached.

It should be appreciated that while the valve member described above moves to an open position when it is pulled axially out of the nipple, it is possible, although less preferred, that the valve member could be configured to open when it is pushed axially into the nipple. The valve member would then be biased outwardly by a spring into sealing relation with a portion of the nipple. In this case, the pitch angle of the valve member/sleeve combination would be chosen so as to be less than the pitch angle of the nipple/tap plate combination, so that the valve member would be opened as the filter element was installed on the filter head. Since high fuel pressure could open the valve, unless a strong spring were used, this is a less-desirable (although still possible) configuration.

It is also noted that the filter element could have a threaded attachment means other than the central threaded opening in the tap ring by which to secure the filter element to the filter head. For example, the open end of the housing for the filter element could include a ring-shaped member around its outer periphery, and the base 14 of the filter head could have a corresponding ring-shaped member, which would allow the filter element to be screwed on to the filter head. Such cooperating ring-shaped members are shown, for example, in Jensen, U.S. patent application Ser. No. 09/583,957, filed May 31, 2000, and entitled "Fuel Filter Assembly With Priming Pump", which is incorporated herein by reference. In this case, the thread pitch of the valve member/sleeve would be different (preferably greater than) than the thread pitch of the ring-shaped members of the filter element and filter head so that the valve member is again opened during attachment of the element to the head. It is also possible that the cylindrical wall 114 could be secured directly to the tap plate (or whatever component encloses the open end of the housing), rather than to the annular body portion of the upper end cap. An appropriate seal would then be provided between the annular body portion and the cylindrical wall to prevent fluid by-pass of the element.

The fuel flows through the filter element and through the end cap structure of the filter element and the nipple structure of the filter head as described above, without substantial restriction. When the element is replaced, the valve element in the filter head closes, which prevents fuel dripping or draining out of the head, and prevents air entering the filter head. The screw-type valve member also prevents the filter head from being used without a filter element installed, as the valve member remains closed, even during high-pressure operation. As a result, only a proper filter element will operate in conjunction with the filter head, and the filter head will not operate without a filter element attached.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element including an enclosure and a ring of filtration media disposed within said enclosure and circumscribing a central axis, said ring of filtration media including first and second ends, and first and second end caps at the first and second ends of the filter media ring, said first end cap including a first annular threaded portion having threads of a first pitch, and said enclosure including a second annular threaded portion, co-axially aligned with said first annular threaded portion, said second annular threaded portion having threads of a second pitch, different from said first pitch.

2. The filter element as in claim 1, further including an annular sidewall supported centrally in said filtration media ring, said annular sidewall supporting the first annular threaded portion.

3. The filter element as in claim 2, wherein said annular sidewall is fixed to said first end cap.

4. The filter element as in claim 3, wherein the annular wall is unitary with said first end cap.

5. The filter element as in claim 1, further including an annular side wall with an axially inner end, and a support extends radially toward the central axis from the axially inner end of said annular side wall, the radial support supporting the first annular threaded portion.

6. The filter element as in claim 1, wherein said second annular threaded portion has a larger internal diameter than said first annular threaded portion.

7. The filter element as in claim 1, further including a tap plate fixed to one end of said housing, said tap plate including a central opening, and a plurality of openings radially outwardly spaced from said central opening.

8. The filter element as in claim 7, wherein the central opening of said tap plate is co-axial with the central axis, and an in-turned annular flange bounds the central opening in the tap plate, the annular flange including the second annular threaded portion formed in said annular flange.

9. The filter element as in claim 8, further including an annular wall supported centrally in said filter media, said annular wall supporting the first annular threaded portion.

10. The filter element as in claim 9, wherein said annular wall is fixed to said first end cap.

11. The filter element as in claim 10, wherein the annular wall is unitary with said first end cap.

12. The filter element as in claim 8, further including an annular side wall with an axially inner end, and an end wall extends radially toward the central axis from said annular side wall, the end wall supporting the first annular threaded portion.

13. The filter element as in claim 12, further including an annular gasket supported by and inwardly bounding the in-turned annular flange.

14. The filter element as in claim 1, further including a tap plate fixed to the housing, said tap plate having a central circular opening, and said second annular threaded portion is provided around said central opening in said tap plate; and an annular portion of the first end cap is bonded to the first end of the filter media ring, an annular side wall is provided integral with said annular portion and projects axially inward into the media ring towards said second end cap, and a support projects radially toward the central axis from the annular sidewall, and said first annular threaded portion is supported by said radial support.

15. The filter element as in claim 1, wherein said first end cap supports the first annular threaded portion.

16. The filter element as in claim 1, wherein the threads of the first annual threaded portion have a greater pitch angle than the threads of the second annular threaded portion.

17. A filter element for attachement to a filter head, wherein the filter head includes a threaded nipple, and an elongated threaded valve member disposed co-axially with the threaded nipple, with the threads on the valve member having a first thread pitch, and the threads on the threaded nipple having a second thread pitch, different from said first thread pitch, the filter element including:

a cylindrical housing and a ring of filtration media disposed within said housing and circumscribing a central axis, said ring of filtration media including first and second ends, and first and second end caps at the first and second ends of the filter media ring, a first annular threaded portion supported within said housing having threads of a first pitch for cooperating with the threads of the nipple, and a second annular threaded portion, co-axially aligned with said first annular threaded portion, having threads of a second pitch, different from said first pitch, for cooperating with the threads of the valve member.

18. The filter element as in claim 17, wherein said first end cap supports the first annular threaded portion.

19. The filter element as in claim 17, further including a tap plate fixed to the housing, said tap plate having a central circular opening, and said second annular threaded portion is provided around said central opening in said tap plate; and an annular portion of the first end cap is bonded to the first end of the filter media ring, an annular side wall is provided integral with said annular body portion and projects axially inward into the media ring towards said second end cap, and an endwall projects radially toward the central axis from the annular side wall, and said first annular threaded portion is supported by said endwall.

20. The filter element as in claim 17, wherein the threads of the first annual threaded portion have a greater pitch angle than the threads of the second annular threaded portion.

21. A filter assembly including a filter element and a filter head, the filter head including an inlet and an outlet, a chamber in a base of the head in fluid communication with the inlet, a central annular nipple projecting outwardly away from the base with outwardly-directed threads, said nipple having a flow passage in fluid communication with the outlet in the filter head, and a valve member moveably located with respect to said nipple, said valve member normally in a first position preventing flow through the nipple to the outlet, and moveable to a second position allowing flow through the nipple to the outlet, said valve member including a portion projecting outwardly from said nipple that includes radially-outward directed threads, the threads on said outwardly-projecting portion having a pitch angle different than the pitch angle of the threads on the nipple; and the filter element including a cylindrical housing and a ring of filtration media disposed within said housing and circumscribing a central axis, said ring of filtration media including first and second ends, and first and second end caps at the first and second ends of the filter media ring, said first end cap including a threaded sleeve having threads with the same pitch angle as the threads on the valve member, and an annular threaded portion, co-axially aligned with said sleeve, having threads with the same pitch angle as the threads on the nipple, whereby the filter element can be spun-on to the filter head by threaded cooperation between the annular threaded portion and the nipple, and the threads on the sleeve and the threads on the valve member cooperate to cause the valve member to move from the first position to the second position.

22. The filter assembly as in claim 21, wherein said valve member in the filter head includes a circular body, a plurality of elongated fingers projecting axially away from one surface of said body, and an elongated engaging portion extending away from an opposite surface of said body, said engaging portion including the outwardly directed threads of the valve member.

23. The filter assembly as in claim 21, wherein the threads on the outwardly-projecting portion of the valve member and on the sleeve have a greater pitch angle than the threads on the nipple and on the annular threaded portion.

24. A filter head for a spin-on filter element, the filter head including an inlet and an outlet, a chamber in a base of the head facing the element in fluid communication with the inlet, a central annular nipple with radially-outward directed threads projecting outwardly away from the base, said nipple having a flow passage in fluid communication with the outlet in the filter head, and a valve member moveably located in said nipple, said valve member normally in a first position preventing flow through the nipple to the outlet, and a moveable to a second position allowing flow through the nipple to the outlet, said valve member including a portion projecting outwardly from said nipple that includes radially-outward directed threads, the threads on said outwardly-projecting portion having a pitch angle different than the pitch angle of the threads on the nipple.

25. The filter head as in claim 24, wherein said valve member in the filter head includes a circular body, a plurality of elongated fingers projecting axially away from one surface of said body, and an elongated cylindrical engaging portion extending away from an opposite surface of said body, said engaging portion including the radially outward directed threads of the member.

26. The filter head as in claim 24, wherein the threads on the outwardly-projecting portion of the valve member have a greater pitch angle than the threads on the nipple.

27. A filter element including a cylindrical housing and a ring filtration media disposed within said housing and circumscribing a central axis, said ring of filtration media including first and second ends, said filter element further including first threaded means for receiving the threads on a nipple of a filter head, said first threaded means having threads of a first pitch, and second threaded means for receiving the threads on a valve member in the nipple, said second thread means co-axially aligned with said first threaded means, and having threads of a second pitch, different from said first pitch.

28. The first element as in claim 27, wherein the threads of the first threaded means of the filter element have a greater pitch angle than the threads of the second threaded means.

* * * * *